J. P. WRIGHT & F. SCHAFER.
MACHINE FOR CLEANING AND POLISHING MATCH SPLINTS.
APPLICATION FILED NOV. 29, 1912.
1,070,092.
Patented Aug. 12, 1913.
4 SHEETS—SHEET 1.
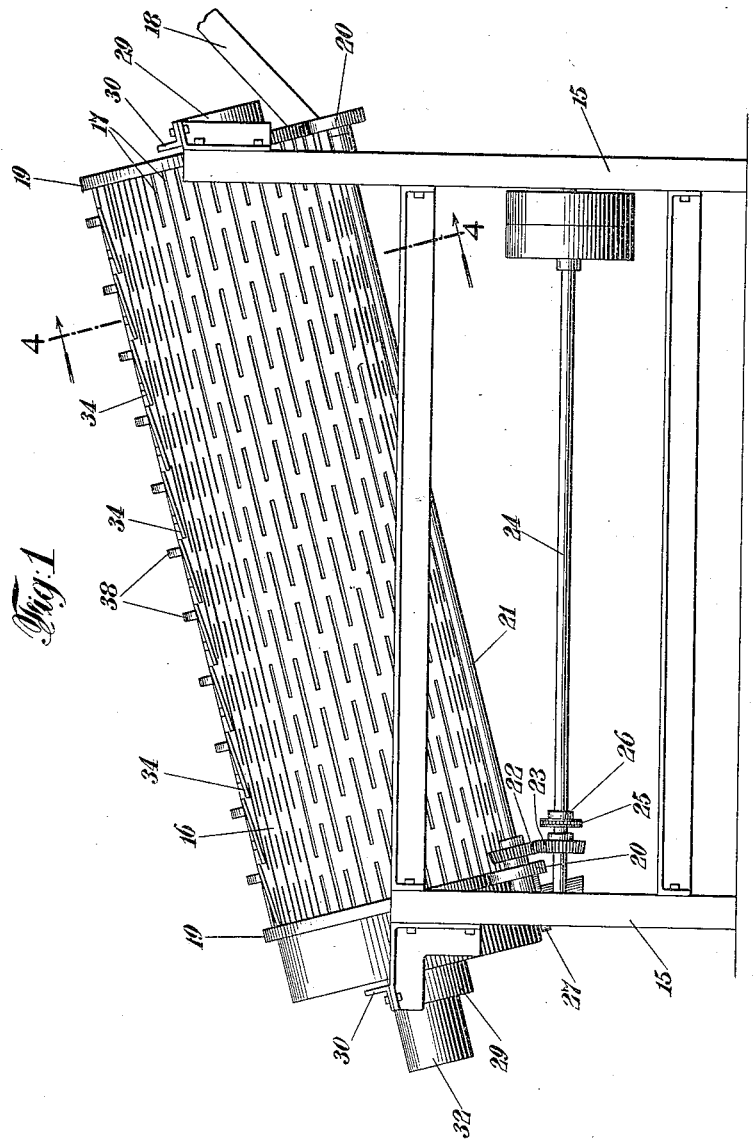

J. P. WRIGHT & F. SCHAFER.
MACHINE FOR CLEANING AND POLISHING MATCH SPLINTS.
APPLICATION FILED NOV. 29, 1912.
1,070,092.
Patented Aug. 12, 1913.
4 SHEETS—SHEET 2.
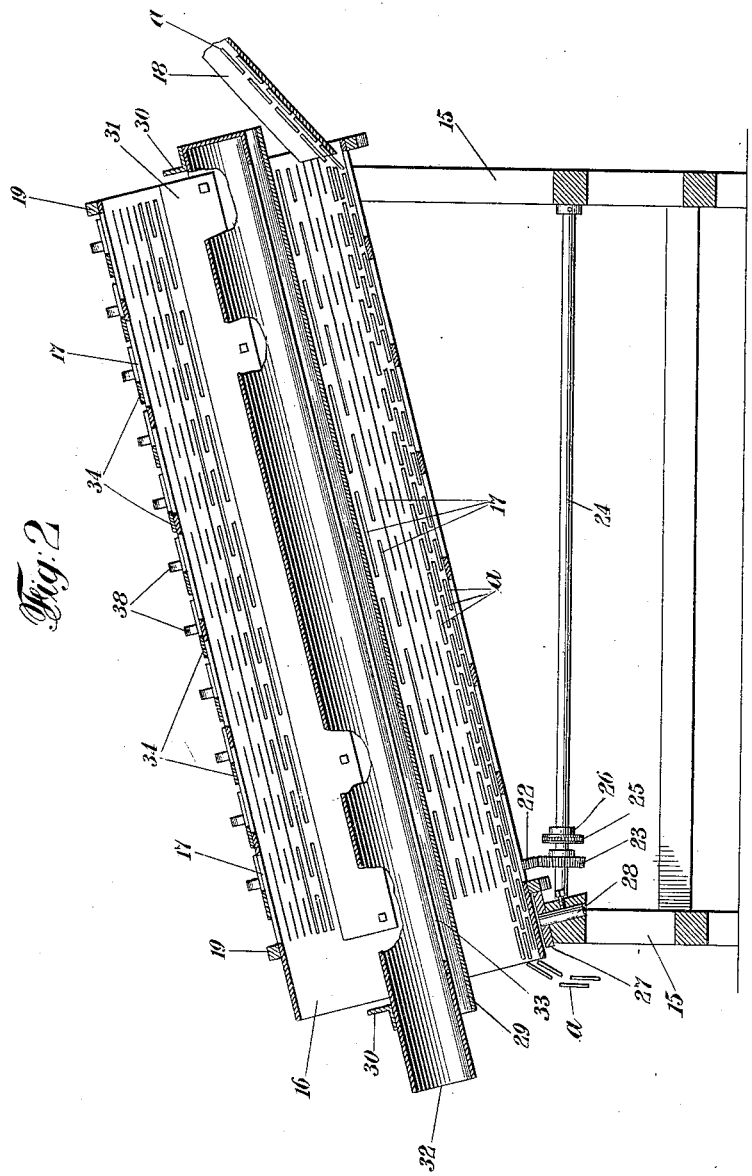
Witnesses:
M. B. Gourley
Frances R. Griffin
Inventors
Jacob P. Wright
Frank Schafer
By their Attorney
John F. Nolen

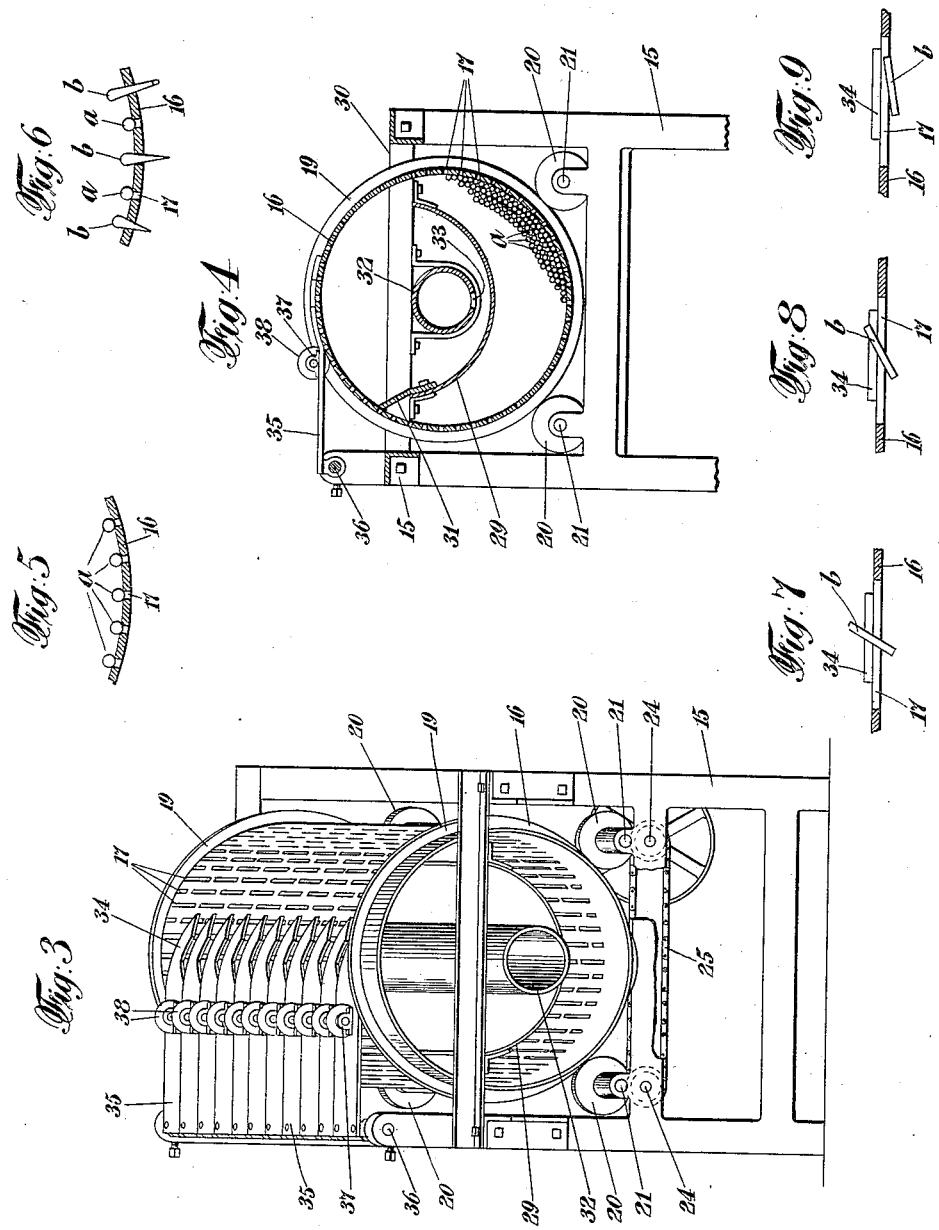

J. P. WRIGHT & F. SCHAFER.
MACHINE FOR CLEANING AND POLISHING MATCH SPLINTS.
APPLICATION FILED NOV. 29, 1912.
1,070,092.
Patented Aug. 12, 1913.
4 SHEETS—SHEET 4.
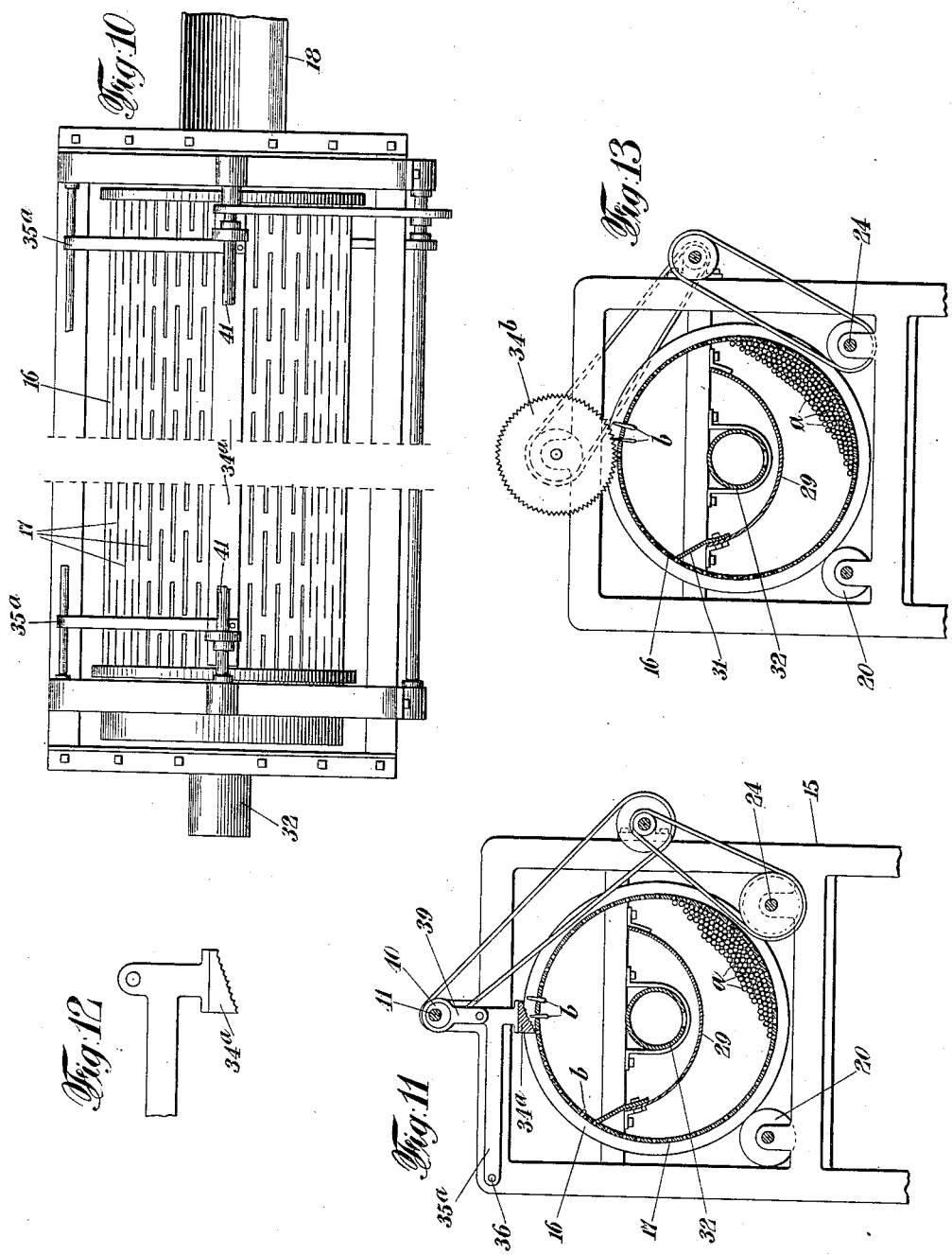

UNITED STATES PATENT OFFICE.

JACOB P. WRIGHT AND FRANK SCHAFER, OF BARBERTON, OHIO, ASSIGNORS TO THE DIAMOND MATCH COMPANY, OF CHICAGO, ILLINOIS, A CORPORATION OF ILLINOIS.

MACHINE FOR CLEANING AND POLISHING MATCH-SPLINTS.

1,070,092. Specification of Letters Patent. Patented Aug. 12, 1913.

Application filed November 29, 1912. Serial No. 733,926.

*To all whom it may concern:*

Be it known that we, JACOB P. WRIGHT and FRANK SCHAFER, citizens of the United States, and residents of Barberton, in the county of Summit and State of Ohio, have invented certain new and useful Improvements in Machines for Cleaning and Polishing Match-Splints, of which the following is a specification.

This invention relates to an apparatus for cleaning and polishing match splints, or the like; its object being to provide an apparatus whereby imperfect splints and slivers shall be efficiently and expeditiously separated and removed from the perfect splints, and the latter at the same time shall be smoothed by attrition.

To this end, the invention, in its preferred form of embodiment, comprises a circumferentially-perforated rotatable container, preferably inclined, into which a mass of splints are promiscuously delivered and therein commingled and tumbled, the circumferential perforations of the container being of such form and dimensions that thin splints or pieces of splints may freely escape from the container by way of said perforations, while wedge-shaped splints and slivers may stick into the perforations; means for causing the wedge-shaped splints and slivers thus held in the perforations to fall into the container, and means within the container for catching the falling splints and slivers and thence discharging them to a point exteriorly of the container.

The invention also comprises various features of construction and operation, which will be hereinafter described and claimed.

In the drawings—Figure 1 is a side elevation of an apparatus embodying the preferred form of our invention. Fig. 2 is a longitudinal vertical section thereof. Fig. 3 is an end elevation of the apparatus. Fig. 4 is a transverse vertical section, as on the line 4—4 of Fig. 1. Figs. 5 and 6 represent fragments, in transverse section, of the rotating drum; the former figure indicating the relative sizes of the slots and perfect splints, and the latter figure showing wedge-shaped slivers as held in the slots. Figs. 7, 8 and 9 represent fragments, in longitudinal section, of the drum and the adjacent splint-pushing member, showing the progressive discharging action of the latter upon an imperfect splint or sliver held in a slot. Fig. 10 is a partial plan of an apparatus in which is illustrated a vibratory bar structure for ejecting the wedged splints from the perforations of the drum. Fig. 11 is a transverse vertical section of Fig. 10. Fig. 12 is a detail of the vibratory ejector bar. Fig. 13 is a view similar to Fig. 11, illustrating a modification in which an ejecting roller is employed.

The numeral 15 designates a substantial supporting frame upon which a splint container, as 16, is mounted to rotate, preferably in an inclined position. As herein illustrated the container is in the form of a large drum, the wall of which is perforated with numerous slots 17 which extend longitudinally of the drum; each of the slots being of less width, but preferably longer, than a perfect match splint (*a*). Leading into the upper end of the drum is a feed member, such as the chute 18, by means of which the match splints to be cleaned and polished are delivered promiscuously into the drum. The splints thus fed to the drum gravitate therein toward its lower or discharging end, and during their descent the rotatory action of the drum thereon causes them to lie parallel to each other or substantially so, and to pile up on one side of the drum, as indicated in Figs. 4, 11 and 13. The attrition resulting from the rolling or tumbling of the mass of splints tends to break the surface fibers thereof, and smooth the splints, and as the thin splints and pieces of splints and the wedge-shaped splints and slivers contact with the wall of the drum the former pass through the slots and escape from the drum before their passage to the lower end of the drum, and the narrow portions of the wedge-shaped splints and slivers enter and become wedged in the slots. Thus the imperfect splints are prevented from passing onward with the perfect splints to the discharging end of the drum.

In the present instance the drum is provided at or near its respective ends with external rings 19 which bear upon suitably-disposed rollers 20 carried by a pair of parallel shafts 21, which are journaled in bearings in the end members of the frame, whereby when said rollers are concurrently actuated the drum is bodily rotated about its longitudinal axis. The shafts 21 are provided, near their lower ends, with gear wheels 22 which mesh with gear wheels 23 on a pair of shafts 24 which are also journaled in bearings in the end members of the frame, the latter shafts being coupled by a sprocket chain 25 and wheels 26 so as to be rotated in concert when one of the shafts 24 is driven from a suitable source of power, and thus concurrently actuate the shafts 21 and their rollers 20. The drum is preferably held in active position upon the rollers by the abutment of the ring 19 at the lower end of the drum with a roller 27 which is carried by a stud 28 supported in the adjacent end member of the frame.

Within the drum are receiving and exhausting devices for the wedge-shaped splints or slivers which fall or are expelled from the slots of the rotating drum, which devices, in a simple and efficient form, are of the following description: Extending longitudinally through the drum is a trough 29 the ends of which are bolted or otherwise secured to cross-bars 30 on the respective end frames. One side of the trough is provided with an extension 31 which lies in proximity to the inner wall of the drum, throughout its length or nearly so, and constitutes a scraper for a purpose which will presently appear. Through the trough extends an exhaust pipe 32 which is also conveniently supported by the cross bars 30. The upper end of this pipe is closed while its lower end extends through and beyond the lower end of the drum and leads to a suitable point of discharge. This pipe is connected with a suitable exhaust fan or the like (not shown). The underside of the pipe is provided with a longitudinally-extending opening 33 which affords communication between the interior of the pipe and the trough and thus permits the withdrawal from the latter into the pipe of imperfect splints and slivers which may fall into the trough from the slots of the rotating drum as they are carried above the trough.

As a means to push from the slots of the drum, as they pass above the trough, the outwardly projecting slivers that are wedged in the slots, we provide a series of fingers 34 having beveled edges which extend adjacent the exterior of the drum and in the path of the projecting slivers. In the present instance these fingers are formed upon and comprise the free ends of plates 35 which are pivotally supported at their outer ends upon a rod 36 which extends through and between the respective end members of the main frame. Journaled in a bracket 37 on each of the plates is a small roller 38 which passes through a slot in the plate and bears on the periphery of the drum so as to keep the plates from resting on the drum. By this construction it will be seen that in case the imperfect splints or slivers (b) as they are carried above the trough do not drop by gravity from the slots, the outwardly projecting portions of such slivers, &c. will abut against the opposing angular edges of the fingers 34 and be thereby deflected lengthwise and down through the slots as indicated in Figs. 7, 8 and 9. The slivers thus released will be caught by the trough and be withdrawn therefrom, by suction, into and through the pipe 32; and be thence discharged to a point remote from the drum. In case, however, some of the slivers thus deflected by the fingers do not fall from the slots, they will come in forcible contact with the opposing edge of the scraper 31 and be thereby forcibly extracted.

In Figs. 10, 11 and 12 we show a modification of the devices for freeing the projecting slivers (b) from the slots of the drum. In this construction a vibratory bar $34^a$ is arranged directly above and longitudinally of the drum 16 in such manner as to intercept and act upon the projecting slivers. The lower face of the bar is inclined as indicated, so as gradually to beat or force through the slots the opposing slivers, and it is also serrated or otherwise roughened in order to prevent the ends of the slivers from slipping off the bar. This bar is carried by two rock arms $35^a$ which are pivoted on the rod 36 and are connected by links 39 with eccentrics 40 on a shaft 41 which has its bearings in brackets on the end members of the frame, said shaft having suitable belt and pulley connections with the driving shaft 24 of the apparatus.

In Fig. 13 we show still another modification wherein a peripherally grooved or corrugated roller $34^b$ is substituted for the vibratory bar; said roller being borne by the shaft 41 and being rotated concurrently with the drum. The projecting ends of the wedged slivers (b) enter the peripheral grooves of the roller and through the concurrent rotation of the roller and drum such slivers are pushed down out of the slots.

We claim as our invention—

1. The combination of a rotatable splint container having in its wall perforations to receive and hold wedge-shaped splints or slivers, and means within the container for catching and discharging the said splints or slivers as they fall from the perforations.

2. The combination of a rotatable splint container having in its wall longitudinally-disposed slots of less width and of greater length than a perfect splint, whereby thin splints may escape through the slots and wedge-shaped splints become fast therein, and means within the container for catching and discharging said wedge-shaped splints as they fall from the slots.

3. The combination of a rotatable splint container having in its wall perforations to receive and hold wedge-shaped splints or slivers, means for expelling said splints or slivers from the slots and into the container, and means within the container for catching and discharging said splints or slivers as they fall from the slots.

4. The combination of a rotatable splint container having in its wall perforations to receive and hold wedge-shaped splints or slivers, a stationary trough extending through said container in position to catch the splints or slivers as they fall from the perforations, and means for discharging said splints or slivers from the receiver.

5. The combination of a rotatable splint container having in its wall perforations to receive and hold wedge-shaped splints or slivers, means for expelling said splints or slivers from the perforations and into the container, a stationary trough extending through said container in position to catch the splints or slivers as they fall from the perforations and within the container, and means for discharging said splints or slivers from the trough.

6. The combination of a rotatable splint container having in its wall perforations to receive and hold wedge-shaped splints or slivers, fingers extending above said container and adjacent the periphery thereof, said fingers having angular portions adapted to act upon the outwardly-projecting portions of said splints or slivers and deflect them down into and through the perforations, and means within the drum for catching and discharging said splints or slivers as they fall from the perforations.

7. The combination of a rotatable splint container having in its wall perforations to receive and hold wedge-shaped splints or slivers, a series of plates pivotally mounted adjacent the container and provided with angular fingers which overhang the container in position to act upon the outwardly-projecting portions of said splints or slivers and deflect them down into and through the perforations, and means within the drum for catching and discharging said splints or slivers as they fall from the perforations.

8. The combination of a rotatable splint container having in its wall perforations to receive and hold wedge-shaped splints or slivers, a stationary trough extending through said container in position to catch the splints or slivers as they fall from the perforations, and a scraper arranged adjacent to the inner side of the drum and above the trough.

9. The combination of a rotatable splint container having in its wall perforations to receive and hold wedge-shaped splints or slivers, a stationary trough extending through said container in position to catch the splints or slivers as they fall from the perforations and within the container, and an exhaust pipe extending along and communicating with said trough.

Signed at Barberton, in the county of Summit and State of Ohio this 23rd day of November, A. D. 1912.

JACOB P. WRIGHT.
FRANK SCHAFER.

Witnesses:
V. A. JOHNSTON,
SABINA PARKS.

---

Copies of this patent may be obtained for five cents each, by addressing the "Commissioner of Patents, Washington, D. C."